United States Patent
Maung et al.

(10) Patent No.: US 10,410,205 B2
(45) Date of Patent: Sep. 10, 2019

(54) APPARATUS AND METHOD FOR PERFORMING PAYMENT TRANSACTION USING DYNAMIC MST CONFIGURATION

(71) Applicant: Samsung Electronics Co., Ltd., Suwon-si, Gyeonggi-do (KR)

(72) Inventors: Dave Maung, Mountain View, CA (US); Aneesh Nainamvalappil, Mountain View, CA (US); Minseok Park, Mountain View, CA (US); Chung Liu, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 460 days.

(21) Appl. No.: 15/217,661

(22) Filed: Jul. 22, 2016

(65) Prior Publication Data

US 2017/0053264 A1 Feb. 23, 2017

Related U.S. Application Data (60) Provisional application No. 62/208,224, filed on Aug. 21, 2015.

(51) Int. Cl.
*G06Q 20/34* (2012.01)
*G06Q 20/20* (2012.01)
*G06Q 20/32* (2012.01)

(52) U.S. Cl.
CPC ......... *G06Q 20/341* (2013.01); *G06Q 20/20* (2013.01); *G06Q 20/327* (2013.01); *G06Q 20/3224* (2013.01)

(58) Field of Classification Search
CPC ........ G06Q 20/08; G06Q 20/40; G06Q 20/32; G06Q 20/20; G06Q 20/34; G06K 7/08

USPC ............... 705/44; 235/380, 449, 494
See application file for complete search history.

(56) References Cited

U.S. PATENT DOCUMENTS

| | | | |
|---|---|---|---|
| 7,483,842 B1 | 1/2009 | Fung et al. | |
| 8,161,100 B1 | 4/2012 | Lopez et al. | |
| 8,504,102 B2 | 8/2013 | Karaoguz et al. | |
| 8,628,012 B1 * | 1/2014 | Wallner | G06K 7/08 235/380 |
| 8,756,186 B2 | 6/2014 | Bolivar et al. | |
| 8,814,046 B1 * | 8/2014 | Wallner | G06K 7/08 235/449 |
| 9,864,994 B2 * | 1/2018 | Huang | G06Q 20/36 |

(Continued)

FOREIGN PATENT DOCUMENTS

| | | |
|---|---|---|
| EP | 2819078 A1 | 12/2014 |
| KR | 10-2014-0025431 A | 3/2014 |

OTHER PUBLICATIONS

European Search Report dated May 7, 2018, issued in European Application No. 16839529.1.

(Continued)

*Primary Examiner* — Olusegun Goyea
(74) *Attorney, Agent, or Firm* — Jefferson IP Law, LLP (57) ABSTRACT

An apparatus and method for performing a payment transaction are provided. The method includes transmitting context data to a magnetic secure transmission (MST) configuration server, receiving an MST configuration from the MST configuration servicer, and executing the payment transaction based on the MST configuration. The context data being associated with the payment transaction.

20 Claims, 5 Drawing Sheets

(56) References Cited

U.S. PATENT DOCUMENTS

| | | |
|---|---|---|
| 2008/0048022 A1 | 2/2008 | Vawter |
| 2010/0262537 A1 | 10/2010 | Park |
| 2012/0280035 A1 | 11/2012 | Liu et al. |
| 2013/0024372 A1 | 1/2013 | Spodak et al. |
| 2013/0078921 A1 | 3/2013 | Wilson et al. |
| 2013/0110709 A1 | 5/2013 | Hodge et al. |
| 2013/0124319 A1 | 5/2013 | Hodge et al. |
| 2013/0282570 A1 | 10/2013 | Charrat et al. |
| 2014/0040114 A1 | 2/2014 | Baumgart et al. |
| 2014/0188843 A1 | 7/2014 | Smiling |
| 2014/0246490 A1 | 9/2014 | Graylin et al. |
| 2014/0249948 A1* | 9/2014 | Graylin .................. G06Q 20/12 705/21 |
| 2014/0304094 A1 | 10/2014 | Reddy et al. |
| 2014/0040003 A1 | 2/2015 | Kothari et al. |
| 2015/0149308 A1 | 5/2015 | Lin |
| 2015/0178724 A1 | 6/2015 | Ngo et al. |
| 2015/0227925 A1 | 8/2015 | Filler |
| 2015/0269496 A1 | 9/2015 | Arguelles |
| 2015/0371234 A1* | 12/2015 | Huang .................. G06Q 20/36 705/44 |
| 2016/0125417 A1* | 5/2016 | Huang .................. G06Q 20/36 705/71 |
| 2016/0364715 A1* | 12/2016 | Cho ...................... G06Q 20/325 |
| 2017/0083877 A1* | 3/2017 | Dix ....................... G06Q 20/085 |

OTHER PUBLICATIONS

European Search Report dated Jun. 12, 2019, issued in European Application No. 16 839 529.1-1217.

* cited by examiner

APPARATUS AND METHOD FOR PERFORMING PAYMENT TRANSACTION USING DYNAMIC MST CONFIGURATION

CROSS-REFERENCE TO RELATED APPLICATION(S)

This application claims the benefit under 35 U.S.C. § 119(e) of a U.S. Provisional application filed on Aug. 21, 2015, in the U.S. Patent and Trademark Office and assigned Ser. No. 62/208,224, the entire disclosure of which is hereby incorporated by reference.

TECHNICAL FIELD

The present disclosure relates to an apparatus and method for performing a payment transaction using a dynamic magnetic secure transmission (MST) configuration. More particularly, the present disclosure relates to an apparatus and method for performing a payment transaction using a dynamic MST configuration based on context data transmitted from an electronic device.

BACKGROUND

Payment transactions have been performed by swiping a card having a magnetic stripe at a point of sales (POS) device including a magnetic stripe reader. As the card is swiped various information necessary to complete the transaction is detected by the POS device. For example, the POS device uses identification information, payment type information, access control function information, card number (or primary account number PAN), and/or a card validation value detected from the magnetic strip of the card to successfully perform the payment transaction.

Alternative methods of performing payment transactions using an electronic device have been implemented. For example, magnetic stripe data may be stored at the electronic device and the electronic device may wirelessly transmit the magnetic stripe data to the POS device. Each electronic device uses a predetermined magnetic secure transmission (MST) configuration stored at the electronic device in order to generate a signal to securely transmit the magnetic stripe data. However, signal generated using the predetermined MST configuration is not compatible with each electronic device, merchant, POS device, and/or card network and results in unsuccessful payment transactions where an alternative payment method (e.g., card, cash, etc.) is necessary.

Accordingly, there is a need for an apparatus and method for improving successful payment transactions using an electronic device. In addition, there is a need for an apparatus and method for dynamically determining a MST configuration to perform a payment transaction based on context data associated with the electronic device.

SUMMARY

Aspects of the present disclosure are to address at least the above-mentioned problems and/or disadvantages and to provide at least the advantages described below. Accordingly, an aspect of the present disclosure is to provide an apparatus and method for performing a payment transaction using a dynamic magnetic secure transmission (MST) configuration.

In accordance with an aspect of the present disclosure, a method for performing a payment transaction is provided. The method includes transmitting context data to a magnetic secure transmission (MST) configuration server, the context data being associated with the payment transaction; receiving an MST configuration from the MST configuration servicer; and executing the payment transaction based on the MST configuration.

In accordance with another aspect of the present disclosure, an electronic device is provided. The electronic device includes a display; a transceiver configured to transmit and receive signals; a memory, one or more programs being stored in the memory; and one or more processors are configured to execute the one or more programs including instructions for: transmitting context data to a magnetic secure transmission (MST) configuration server, the context data being associated with a payment transaction, receiving an MST configuration from the MST configuration server, and executing the payment transaction based on the MST configuration.

In accordance with another aspect of the present disclosure, a method for providing a magnetic secure transmission (MST) configuration for a purchase transaction is provided. The method includes receiving, at a MST configuration server, context data associated with the purchase transaction; determining, at the MST configuration server, an MST configuration based on the context data; and transmitting, from the MST configuration server, the MST configuration to an electronic device. The MST configuration may be used to execute the purchase transaction.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of various embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Detailed descriptions of various aspects of the present disclosure will be discussed below with reference to the attached drawings. The descriptions are set forth as examples only, and shall not limit the scope of the present disclosure.

The detailed description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions are omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the present disclosure are provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Unless defined differently, all terms used in the present disclosure, including technical or scientific terms, have meanings that are understood generally by a person having ordinary skill in the art. Ordinary terms that may be defined in a dictionary should be understood to have the meaning consistent with their context, and unless clearly defined in the present disclosure, should not be interpreted to be excessively idealistic or formalistic.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an MP3 player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a digital video disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

Various embodiments of the present disclosure include an apparatus and method for performing a payment transaction using a dynamic magnetic secure transmission (MST) configuration.

Figure 1:
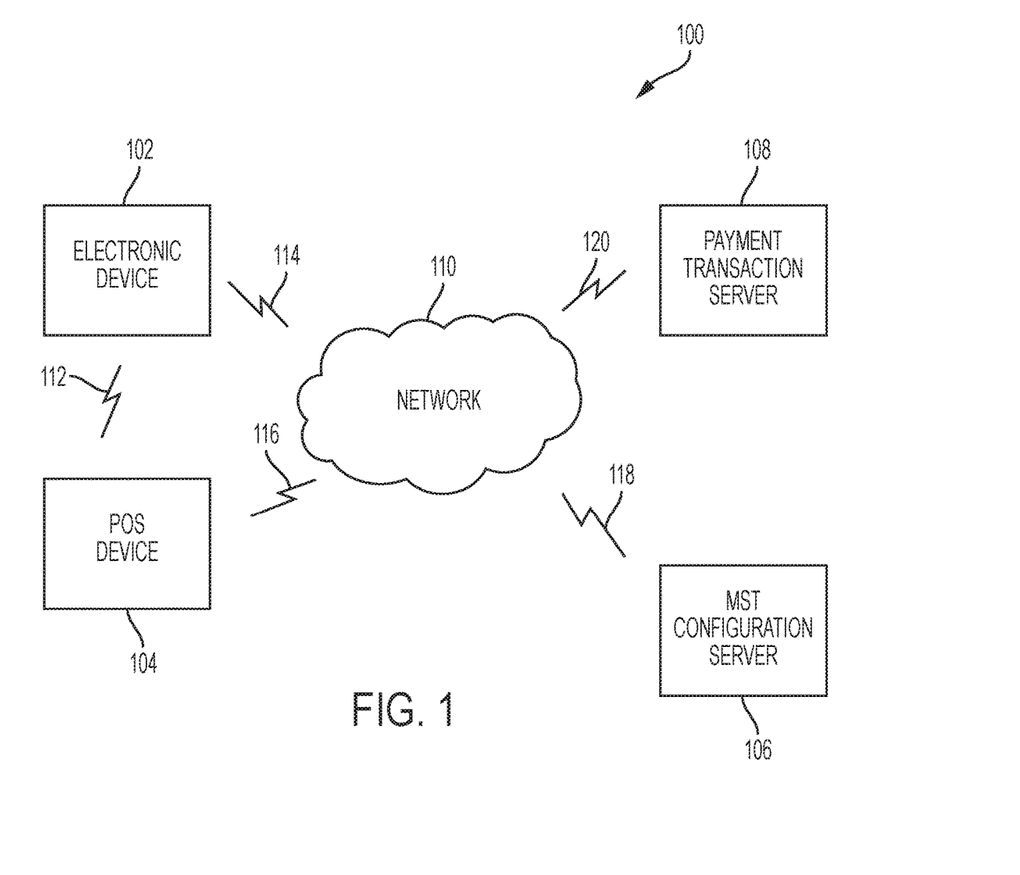
FIG. 1 illustrates a system for performing a payment transaction according to various embodiments of the present disclosure.

FIG. 1 illustrates a system for performing a payment transaction according to various embodiments of the present disclosure.

Referring to FIG. 1, payment transaction system 100 includes an electronic device 102, a point of sale (POS) device 104, a MST configuration server 106, a payment transaction server 108, and network 110. While not illustrated, other network elements may be included in payment transaction system 100 such as a payment transaction network, a provisioning and authentication server, a payment method issuer server, an acquirer server, a third party processor server of the issuer, etc.

The electronic device 102 may be configured to perform a payment transaction. For example, a payment application may be stored and executed at the electronic device 102. Payment information such as magnetic stripe information, account information, etc. may be stored at the electronic device 102 where the payment application may access the payment information during a payment transaction. The electronic device 102 may be configured to communicate with the POS device 104 to perform a payment transaction. For instance, the electronic device 102 may generate a signal using a MST configuration received from the MST configuration server 106. The signal is transmitted to the POS device 104 and includes information associated with the payment information stored at the electronic device 102.

In an exemplary embodiment, the POS device 104 may be further configured to transmit information to the electronic device 102. For example, the POS device 104 may transmit information associated with a merchant corresponding to the POS device and/or configuration information of the POS device 104 including manufacturer and device configuration information (e.g., hardware capabilities, software capabilities, etc.). In addition, the POS device 104 may transmit information to the electronic device 102 indicating that the payment transaction is successful if the payment transaction server 108 approves the payment transaction.

The MST configuration server 106 is configured to generate an MST configuration. In an exemplary embodiment, the MST configuration server 106 receives context information from the electronic device 102, generates an MST configuration based on the context information, and transmits the generated MST configuration to the electronic device 102 where the electronic device 102 uses the MST configuration to perform the payment transaction with the POS device 104.

The MST configuration server 106 may be further configured to generate a plurality of different MST configurations based on the context information received from the electronic device 102. The MST configuration server 106 may score, rank, and/or assign a weight to each generated MST configuration based on various context data parameters. In an exemplary embodiment, the MST configuration server 106 may transmit one MST configuration to the electronic device 102 where the MST configuration is selected based on the highest ranked MST configuration. The ranked MST configurations may be a plurality of MST configurations generated based on the context information received from the electronic device 102 or the plurality of ranked MST configurations may be previously generated MST configurations based on previously transmitted context information from one or more electronic devices. Alternatively, the MST configuration server 106 may transmit a plurality of the generated MST configurations to the electronic device 102 where the electronic device 102 may select one of the plurality of MST configurations to perform the payment transaction. The electronic device 102 may alternatively perform the payment transaction using each of the generated MST configurations until the payment transaction is successful.

In addition, the MST configuration server 106 may monitor generated MST configurations over time. For example, the MST configuration server 106 may monitor previously generated MST configurations for a plurality of different electronic devices, POS devices, merchants, and/or locations to determine a MST configuration most likely to result in a successful payment transaction.

The payment transaction server 108 is configured to authenticate and approve the payment transaction. In an exemplary embodiment, the electronic device 102 transmits payment information including the MST configuration generated by the MST configuration server 106 to the POS device 104. The POS device 104 transmits the payment information including the MST configuration to the payment transaction server 108 for authentication and approval. The payment transaction server 108 determines whether to approve the payment transaction based on the payment information and the MST configuration generated by the MST configuration server 106. When the payment transaction is approved, the payment transaction server 108 transmits a message to the POS device 104 indicating that the payment transaction is successful.

In an exemplary embodiment, messages may be transmitted between the electronic device 102, the POS device 104, the MST configuration server 106, and/or the payment transaction server 108 indicating the status of the payment transaction (e.g., successful or unsuccessful). For example, the POS device 104 may transmit a message to the electronic device 102 to indicate that the payment transaction is successful. The electronic device 102 may transmit a message to the MST configuration server 106 indicating that the MST configuration used for the payment transaction was successful after receiving the electronic device 102 receives the message from the POS device 104. Alternatively, the payment transaction server 108 may transmit a message to the electronic device 102 and/or the POS device 104 to indicate that the payment transaction is successful.

The electronic device 102 is in communication with the POS device 104 through communication link 112 and the network 110 through communication link 114. The POS device 104 is in communication with the network 110 through communication link 116. The MST configuration server 106 is in communication with the network 110 through communication link 118 and the payment transaction server 108 is in communication with network 110 through communication link 120. The communication links 112, 114, 116, 118, and 120 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), LTE Advanced (LTE-A), or combinations thereof. Other wireless protocols can also be used such as short range communication protocols including near field communication (NFC), Bluetooth™, MST, etc. The communication links 112, 114, 116, 118, and 120 can be a direct link or might include various equipment, intermediate components, systems, and networks.

Communication link 112 may be a different communication protocol from at least one of communication links 114, 116, 118, and 120. For example, the POS device 104 and the electronic device 102 may communicate using a short range communication protocol such as including NFC), Bluetooth™, MST, or any other short range communication technique. In addition, if the communication links 114, 116, 118, and 120 use wireless communication protocols, information transmitted over the communication links 114, 116, 118, and 120 may use a short range or a long range communication protocol.

In an exemplary embodiment, the electronic device 102 is configured to transmit the payment information and the context information using different communication protocols. For example, the electronic device 102 may transmit payment information to the POS device 104 using a first communication protocol and the context information to the MST configuration server 106 using a second communication protocol different from the first communication protocol.

The network 110 is configured to transmit and/or receive communications from the electronic device 102, the POS device 104, the MST configuration server 106, and/or the payment transaction server 108. The network 110 may be a telecommunications network including at least one of a computer network, the Internet, the Internet of Things, a telephone network, and/or the like. The network 110 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). The network 110 can be configured to carry one or more types of data, for example, to support voice, push-to-talk, broadcast video, and data communications. While not illustrated in FIG. 1, the network 110 can also comprise additional base stations, controller nodes, telephony switches, internet routers, network gateways, computer systems, communication links, or some other type of communication equipment, and combinations thereof.

Figure 2:
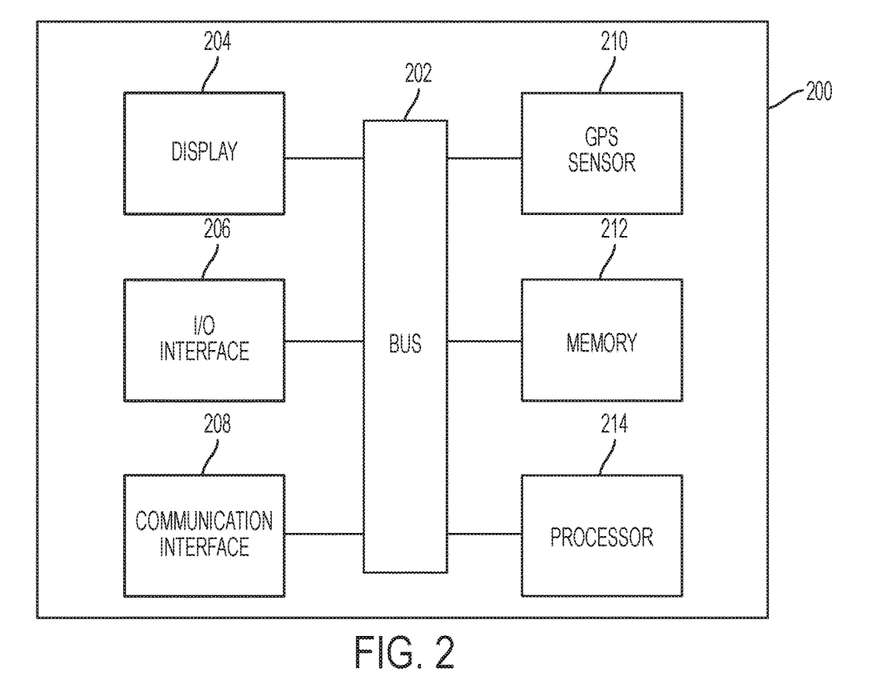
FIG. 2 illustrates an electronic device for performing a payment transaction according to various embodiments of the present disclosure.

FIG. 2 illustrates an electronic device according to various embodiments of the present disclosure.

Referring to FIG. 2, an electronic device 200 includes a bus 202, a display 204, an input/output (I/O) interface 206, a communication interface 208, a global positioning system (GPS) sensor 210, a memory 212, and a processor 214. The electronic device 200 may be any electronic device, including, for example, electronic device 102 illustrated in FIG. 1.

The bus 202 may be circuitry that connects the display 204, the I/O interface 206, the communication interface 208, the GPS sensor 210, the memory 212, and/or the processor 214 to allow communication between the foregoing components. For example, the bus 202 may connect the components of the electronic device 200 so as to allow control messages and/or other information to be communicated between the connected components.

The display 204 may be configured to display various types of information (e.g., multimedia, text data, and/or the like) to the user. The display 204 may be any type of display such as a liquid crystal display (LCD), an organic light-emitting diode (OLED) display such as an active-matrix OLED (AM-OLED) or other type of OLED display, a plasma display, etc.

In an exemplary embodiment, the display 204 may display a graphical user interface (GUI) with which a user may interact with the electronic device 200. In another exemplary embodiment, the display 202 may further include a touch sensor and/or a pressure sensor configured to generate a signal associated with a touch input received at the display 204.

The I/O interface 206 may be configured to receive one or more inputs provided at the electronic device 200 and/or output information from the portable electronic device 200. The I/O interface 206 may send an instruction and/or data, via the bus 202, to the communication interface 208, the memory 212, and/or the processor 214. For example, the I/O interface 206 may provide data associated with an input received via a touch screen, a tactile input device (e.g., button), a microphone, etc. to the processor 214. In addition, the I/O interface 206 may, for example, output instructions and/or data received via the bus 202 from the communication interface 208, the GPS sensor 210, the memory 212, and/or the processor 214 and/or the like, via an I/O device (e.g., a speaker, a display, and/or the like). For instance, the I/O interface 206 may output audio data (e.g., processed using the processor 214) via a speaker.

The communication interface 208 is configured to transmit and/or receive signals. For example, the communication interface 208 may be a transceiver configured to communicate with other devices by establishing a connection with a communication network such as the network 110 using wireless or wired communication. The wireless communication with which the communication interface 208 may use to communicate includes one or more of Wi-Fi, Bluetooth™, NFC, GPS, cellular communication (e.g., Long Term Evolution (LTE), LTE Advanced (LTE-A), Code Division Multiple Access (CDMA), Wideband-CDMA (WD-CMA), Universal Mobile Telecommunications System (UMTS), Wireless Broadband (WiBro), Global System for Mobile Communications (GSM), and/or the like), Infrared Data Association (IrDA) technology, and/or the like. The wired communication with which the communication interface 208 may use to communicate may include at least one of Universal Serial Bus (USB), High Definition Multimedia Interface (HDMI), Recommended Standard 232 (RS-232), Plain Old Telephone Service (POTS), Ethernet, and/or the like. In addition, the communication interface 208 may be used to communicate the MST configuration to a POS device from electronic device 200.

The GPS sensor 210 may be configured to determine location coordinate information of the electronic device 200. For example, the GPS sensor 210 is configured to measure one or more of a latitude coordinate, a longitude coordinate, time, speed, and/or heading associated with the electronic device. In an exemplary embodiment, the GPS sensor 210 may transmit the location coordinate information to the communication interface 208 and/or the processor 214 where context information including the location coordinate information measured by the GPS sensor 210 is transmitted to an MST configuration server via the communication interface 208.

The memory 212 is configured to store information corresponding to the electronic device 200. The memory 212 includes at least one of a non-transitory computer readable storage medium. In an exemplary embodiment, the memory 212 may be a storage device integrally formed with the electronic device 200 such as a hard drive.

The processor 214 may transmit and/or receive information and/or instructions to/from the display 204, the I/O interface 206, the communication interface 208, the GPS sensor 210, and the memory 212. In addition, the processor 214 may interpret the received instructions and/or execute computation or data processing according to the interpreted instructions. In an exemplary embodiment, one or more programs or applications may be stored in the memory 212 where the processor 214 is configured to execute the one or more programs or applications stored in the memory 212.

Figure 3:
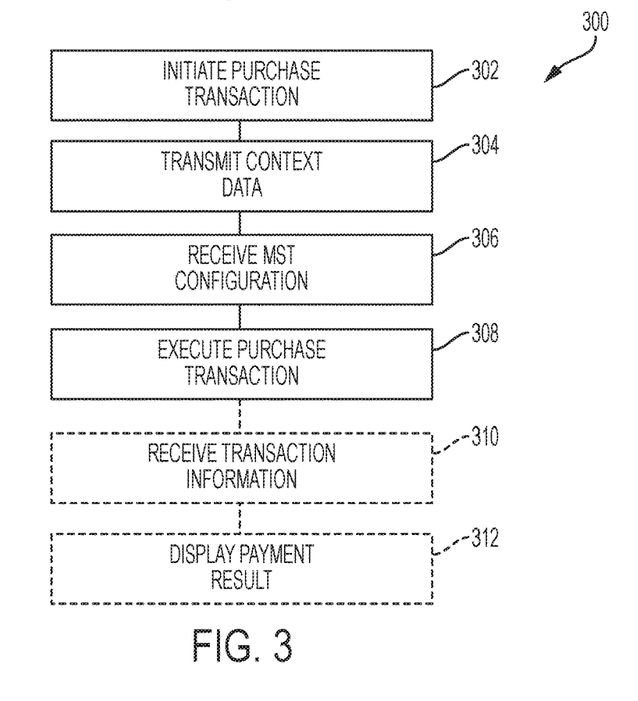
FIG. 3 illustrates a method of performing a payment transaction according to various embodiments of the present disclosure.

FIG. 3 illustrates a flow chart of an exemplary method of performing a payment transaction. Referring to FIG. 3, the method 300 will be discussed with reference to the exemplary payment transaction system 100 illustrated in FIG. 1 and the exemplary electronic device 200 illustrated in FIG. 2. However, the method can be implemented with any suitable payment transaction system and/or electronic device. In addition, although FIG. 3 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

Referring to FIG. 3, at operation 302, a purchase transaction is initiated. For example, a purchase transaction may be initiated at the electronic device 102 or 200 where an input provided at the electronic device 102 or 200 is detected by the I/O interface 206. The detected input may be indicative of an instruction to execute a payment transaction application stored in the memory 212 and/or a selection of a payment method (e.g., card, payment account, etc.). For example, a payment transaction application associated with the payment methods stored at the electronic device 102 may be initiated and a user may select a payment method from the stored payment methods. Information associated with the payment method such as payment method identification information, payment type information, access control function information, account number, card number (or primary account number PAN), and/or a card validation value may be stored in the memory 212 of the electronic device 200.

Alternatively, the purchase transaction may be initiated when the electronic device 102 or 200 comes within a predetermined distance of the POS device 104. For example, if the electronic device 102 or 200 comes within a predetermined distance of the POS device 104, the payment transaction may be initiated by the electronic device 102 or 200 or the POS device 104. For instance, upon detection of the POS device 104, the electronic device 102 or 200 can launch the payment transaction application and/or display a notification on the display 204 to confirm payment transaction initiation or various payment methods available to the electronic device 102 or 200. Alternatively, the POS device 104 can detect that the electronic device 102 or 200 is within the predetermined distance where the POS device 104 can transmit payment transaction initiation information to the electronic device 102 or 200.

At operation 304, context data is transmitted. For example, the electronic device 102 or 200 transmits contact data to the MST configuration server 106 using the communication interface 208.

In an exemplary embodiment, the context data may include one or more of electronic device information, merchant information, POS device information, payment method information, payment network information, networking data information, electronic device location information, or a combination thereof. While the different parameters of the context data are listed above, one of ordinary skill in the art would recognize that the context data may be selected from any of the parameters where one or more of each parameter may be selected to be transmitted to the MST configuration server 106.

The electronic device information and POS device information may include manufacturer or device configuration information (e.g., hardware capabilities, software capabilities, etc.) as well as a current date or time associated with the initiation of the payment transaction. The payment method information may include payment method identification information, payment type information, access control function information, account number, card number, primary account number (PAN), and/or a card validation value. The payment network information may include network information associated with a selected payment method including access and authentication information for the selected payment method network, control information, etc. The networking data information may include access and authentication information for network 110, control information, etc. The electronic device location information may include the coordinate information detected by the GPS sensor 210 or location information provided to the electronic device 102 or 200 from the POS device 104.

At operation 306, a MST configuration is received. For example, the electronic device 102 or 200 can receive the MST configuration from the MST configuration server 106. In an exemplary embodiment, the MST configuration server 106 generates the MST configuration based on the context information.

At operation 308, the purchase transaction is executed. For example, the electronic device 102 or 200 transmits payment transaction information to the POS device 104 using the generated MST configuration. In an exemplary embodiment, the electronic device 102 or 200 can generate a signal using the generated MST configuration where the signal includes the payment information. The signal may be a magnetic signal that mimics the magnetic strip on a traditional payment card. The signal is generated by the electronic device 102 or 200 based on the generated MST configuration. Each different MST configuration results in a different signal being generated while the payment information included in the signal remains the same.

At operation 308, transaction information is received. For example, the POS device 104 may transmit information regarding the payment transaction to the electronic device 102 or 200. The transaction information may include an indication of whether the payment transaction was successful or unsuccessful, context data associated with the transaction, etc.

In an exemplary embodiment, if the payment transaction based on the payment transaction information using the generated MST configuration is authenticated and accepted, the POS device 104 may send an indicator to the electronic device 102 or 200 that the payment transaction was successful. Alternatively, the payment transaction server 108 may transmit the indication that the payment transaction was successful to the electronic device 102 or 200. In another exemplary embodiment, if an indicator has not been received within a predetermined amount of time, the electronic device 102 or 200 can determine that the payment transaction was unsuccessful. Alternatively, the POS device 104 or the payment transaction server 108 may transmit an indication that the payment transaction was unsuccessful to the electronic device 102 or 200.

At operation 310, a payment result may be displayed. For example, the electronic device 102 or 200 may display information indicating that the payment transaction was successful or unsuccessful based on an indication received by the POS device 104 or the payment transaction server 108. In another exemplary embodiment, the electronic device 102 or 200 may further transmit a message to the MST configuration server 106 indicating that the payment transaction was successful after receiving the transaction information.

It is noted that operations 310 and/or 312 are optional and are accordingly illustrated with dashed lines. One of ordinary skill in the art would recognize that none of operations 310 and/or 312 are essential or required for the method of performing the payment transaction illustrated in FIG. 3.

Figure 4:
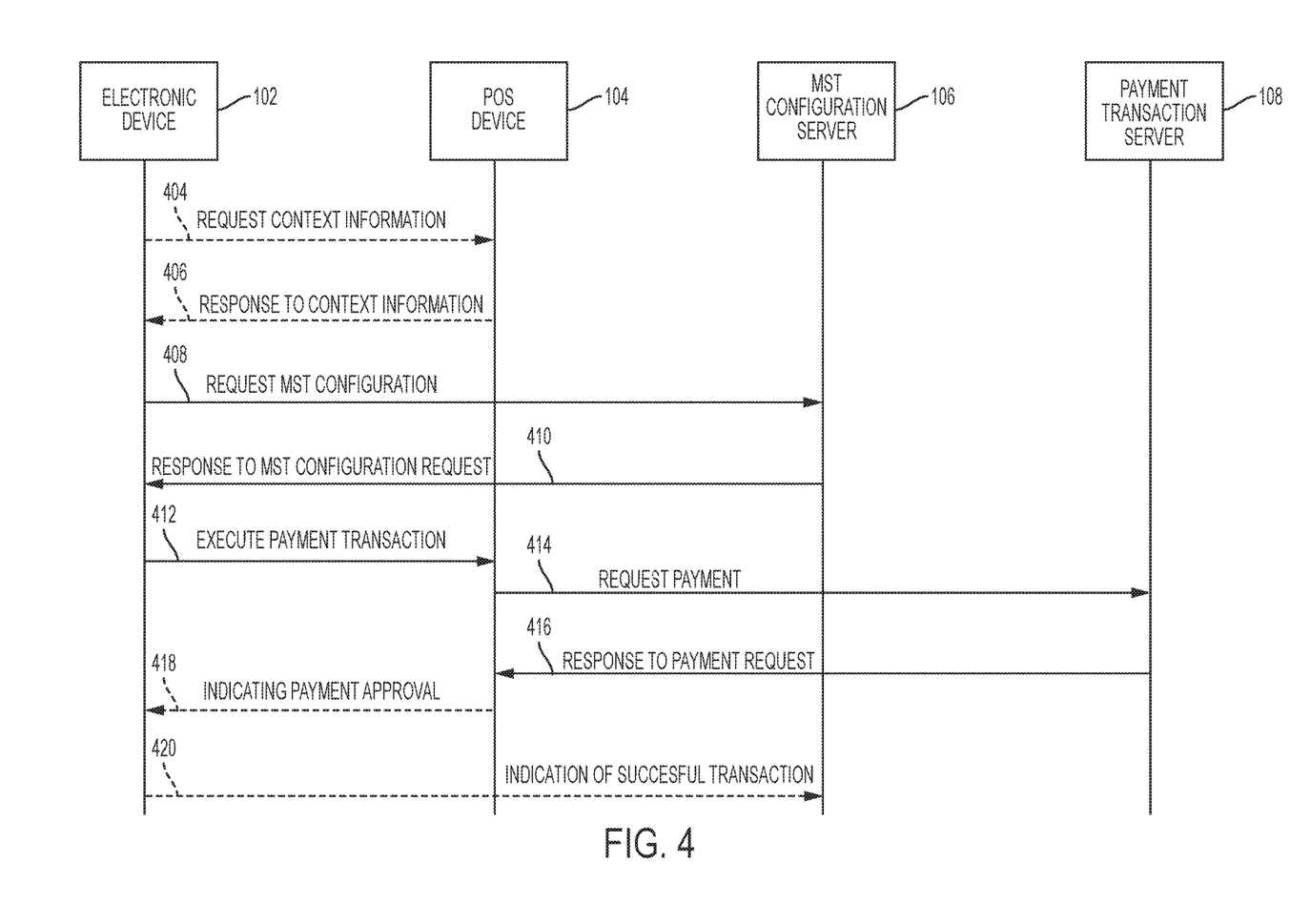
FIG. 4 is an exemplary signaling diagram which illustrates an exemplary method of performing a payment transaction according to various embodiments of the present disclosure.

FIG. 4 is an exemplary signaling diagram that illustrates an exemplary method of performing a payment transaction. Referring to FIG. 4, the signal diagram will be discussed with reference to the exemplary payment transaction system 100 illustrated in FIG. 1. However, the signaling diagram can be implemented with any suitable payment transaction system. In addition, although FIG. 4 depicts signaling performed in a particular order for purposes of illustration and discussion, the signaling discussed herein is not limited to any particular order. Moreover, additional signaling not included in FIG. 4 can also be performed.

Referring to FIG. 4, a payment transaction is initiated between the electronic device 102 and the POS device 104. The payment transaction may be initiated as set forth above. If the payment transaction is initiated by the electronic device 102, the electronic device 102 can request context information at 404 where the requested context information may include context information associated with the POS device 104 and/or a merchant associated with the POS device 104. The POS device 104 responds to the context information request and transmits context information at 406 where the response to the context information request includes at least one of merchant information, POS device information, payment network information, and networking data information to the electronic device 102.

The electronic device 102 then transmits a request for a MST configuration at 408 to the MST configuration server 106. The request for the MST configuration may include context information. The context information may include the context information associated with and/or stored at the electronic device, the context information received from the POS device 104, or a combination thereof. In an exemplary embodiment, while FIG. 4 illustrates that POS device 104 transmits context information to the electronic device 102, the electronic device 102 can alternatively transmit only context information associated with the electronic device 102 where communication between the POS device 104 and the electronic device 102 is not necessary prior to the electronic device 102 transmitting the request for a MST configuration to the MST configuration server 106.

The MST configuration server 106 responds to the MST configuration request at 410 where the MST configuration server 106 generates one or more MST configurations based on the context information received from the electronic device and transmits the one or more MST configurations in response to the MST configuration request. The generation of the one or more MST configurations will be disclosed below.

After the electronic device 102 receives the one or more MST configurations from the MST configuration server 106, the electronic device 102 executes the payment transaction at 412. For example, the electronic device 102 transmits information associated with the payment method and the MST configuration to the POS device 104. The electronic device 102 can store the generated MST configurations received from the MST configuration server 106 or the generated MST configurations may be discarded following the execution of the payment transaction.

The POS device 104 can determine a payment transaction server to transmit a request for payment based on at least one of the payment information, the context information, and the MST configuration. The POS device 104 then transmits the request for payment transaction approval to the payment transaction server 108 at 414 where the request for payment includes the payment information.

The payment transaction server 108 determines whether to approve and authenticate the request for payment. In an exemplary embodiment, the payment transaction server 108 first determines whether to approve the request for payment transaction based on the payment information. The payment transaction server 108 determines whether appropriate funds are available to approve the transaction based on the payment information. If the appropriate funds are available, the payment transaction server 108 responds to the request for payment at 416 where the response to the payment request may include an indication that the payment transaction is approved or declined. If funds are not available and/or the payment request determination process exceeds a predetermined time limit, the payment transaction server 108 may transmit a response including an indication that the payment transaction is declined.

In an exemplary embodiment, if the MST configuration server 106 generates and transmits a plurality of MST configurations to the electronic device 102, the electronic device 102 may execute the payment transaction using each of the generated MST configurations until the payment transaction server 108 determines that the payment information is accepted.

In another exemplary embodiment, if the payment transaction server 108 approves the payment transaction, the POS device 104 and/or the payment transaction server 108 can transmit an indication to the electronic device that the payment transaction is approved at 418. For example, the POS device 104 and/or the payment transaction server 108 may transmit the indication of payment approval using a communication protocol different from the communication protocol used to execute the payment transaction. In addition, if the electronic device 102 receives an indication that the transaction is approved, the electronic device 102 may transmit an indication to the MST configuration server 106 that the payment transaction using the MST configuration is successful at 420 where the MST configuration server 106 may use the indication that the payment transaction using the MST configuration is successful to determine future MST configurations.

It is noted that the request for context information 404, the response to context information 406, the message indicating payment approval 418, and/or the message indicating the successful transaction 420 are optional and are illustrated as dashed lines. One of ordinary skill in the art would recognize that none of 404, 406, 418, and/or 420 are essential or required for the method of performing the payment transaction illustrated in FIG. 4.

Figure 5:
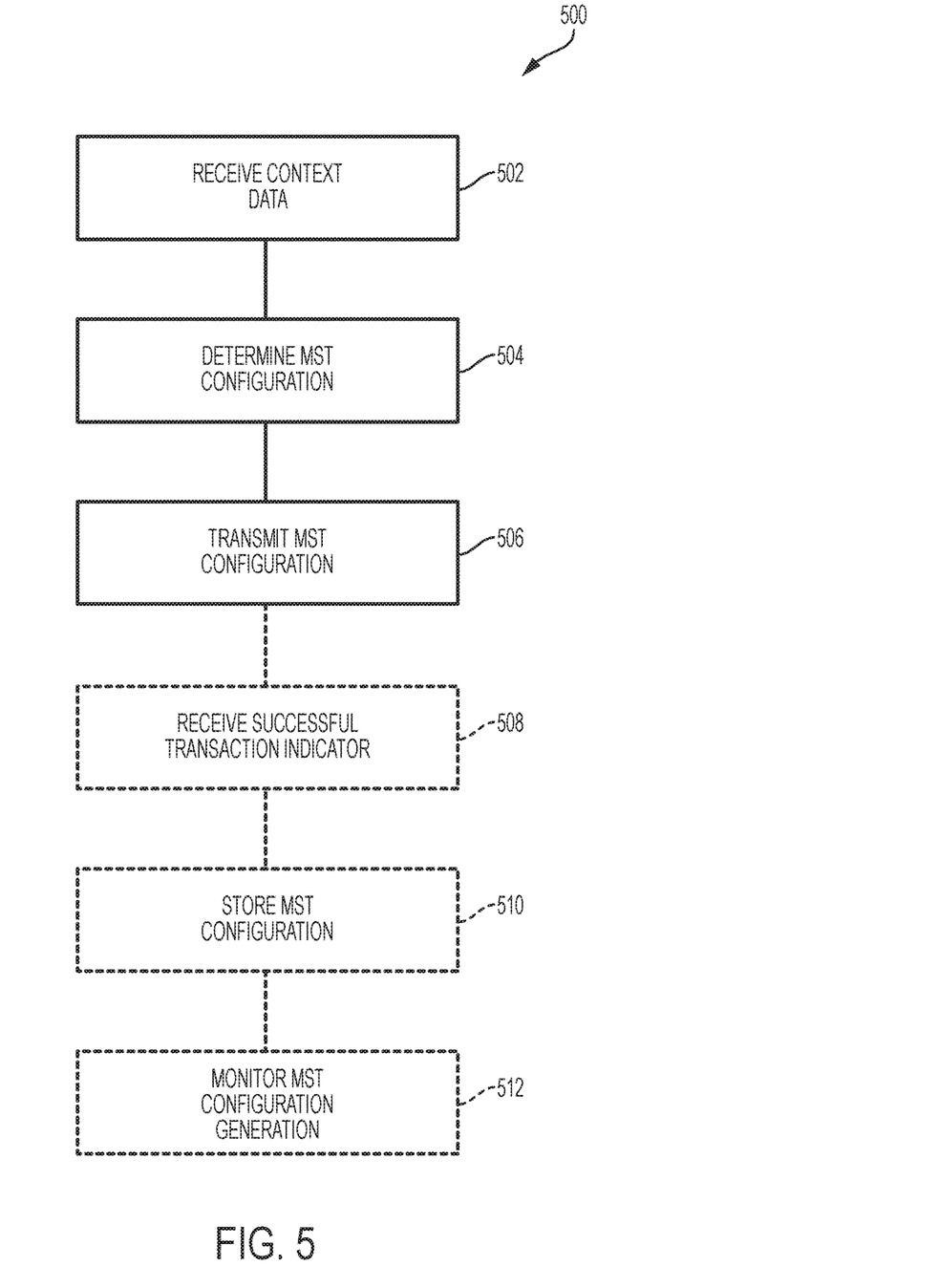
FIG. 5 illustrates a method of providing a magnetic secure transmission (MST) configuration according to various embodiments of the present disclosure.

FIG. 5 illustrates a flow chart of an exemplary method of generating a MST configuration. Referring to FIG. 5, the method 500 will be discussed with reference to the exemplary MST configuration server 106 illustrated in FIG. 1. However, the method can be implemented with any suitable MST configuration server 106. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

Referring to FIG. 5, at operation 502, context data is received. For example, the MST configuration server 106 may receive context data from the electronic device 102 and/or the POS device 104. The context data may include one or more of electronic device information, merchant information, POS device information, payment method information, payment network information, networking data information, electronic device location information, or a combination thereof. The MST configuration server 106 may receive the context data from the electronic device 102, the POS device 104, or a combination thereof.

At operation 504, an MST configuration is determined. For example, the MST configuration server 106 may determine one or more MST configurations based on the received context data. Alternatively, or in addition to determining the one or more MST configurations based on the received context data, the MST configuration server 106 may determine one or more MST configurations based on previously generated MST configurations.

In an exemplary embodiment, an MST configuration may be generated based on one or more context data parameters. For example, if the MST configuration server 106 receives context data associated with a payment method network, a merchant, a location, and a POS terminal model, the resulting MST configuration will include elements associated with the payment method network parameter, the merchant parameter, the location parameter, and the POS terminal model parameter. Each MST configuration element may be individually scored and a resulting overall score or rank of the generated MST configuration may be determined based on the combination of the MST configuration elements.

The score for each MST configuration element may be based on whether the MST configuration element was previously used during a payment transaction and whether the payment transaction was successful. For example, the MST configuration server 106 may monitor the success of payment transactions for similar MST configurations based on the payment method network MST configuration element, the success of payment transactions for similar MST configurations based on the merchant MST configuration element, the success of similar MST configurations based on the location MST configuration element, and/or the success of payment transactions of similar MST configurations based on the POS terminal model element.

The score for each MST configuration element may be combined to determine an overall score for the MST configuration. In an exemplary embodiment, different MST configuration elements may be weighted differently when determining the overall score for the MST configuration. For example, the payment method network element may be weighted more than the location element. In another exemplary embodiment, if a payment transaction is not successful, the score of the overall MST configuration may be reduced. In another exemplary embodiment, the scoring may be based on how many times a payment transaction is successful at a specific or similar location. For instance, payment transaction history may be monitored to determine clusters or groups of MST configurations that resulted in a successful payment transaction. The more times an MST configuration results in a successful payment transaction at a specific location, the higher the score, rank, and/or confidence level in predicting future successful payment transactions using the MST configuration.

In an exemplary embodiment, the MST configuration server 106 may determine the MST configuration to be used for the payment transaction based on the overall score of each MST configuration where the highest score may be indicative of the likelihood the payment transaction will be successful using the MST configuration. If the MST configuration server 106 is determining a plurality of MST configurations, the MST configuration server 106 may select and/or generate MST configuration based on the highest overall scores.

At operation 506, the MST configuration is transmitted. For example, the MST configuration server 106 transmits the determined MST configuration to the electronic device 102. The transmitted MST configuration is used to generate a signal that includes payment information to perform the payment transaction.

At operation 508, an indicator of a successful transaction is received. For example, the MST configuration server 106 may receive a message from the electronic device 102, the POS device 104, and/or the payment transaction server 108 indicating that the payment transaction implementing the MST configuration was successful. It is noted that FIG. 4 illustrates that the MST configuration server 106 receives the message indicating the successful transaction 420 from the electronic device 102. However, the message indicating the successful transaction may additionally, or alternatively, be transmitted by the POS device 104.

At operation 510, the MST configuration can be stored. For example, the MST configuration server 106 may store the MST configuration if the MST configuration has been generated for the first time. The MST configuration may be stored at any time including before or after receiving the indicator of a successful transaction.

If the MST configuration was determined based on a previously used and previously stored MST configuration, the MST configuration server 106 may update the score of the MST configuration based on whether the payment transaction using the previous MST configuration was successful.

At operation 512, the generation of MST configurations can be monitored. For example, the MST configuration server 106 may generate MST configurations for a plurality of electronic devices, a plurality of different payment methods, a plurality of different merchants, a plurality of different locations, and/or a plurality of different POS terminals. The MST configuration server 106 may monitor the generated MST configurations using one or more MST configuration elements over time to determine whether certain MST configuration element combinations and/or arrangements are more successful than others. If the MST configuration server 106 identifies that a MST configuration combination and/or arrangement is more successful, the MST configuration server 106 may increase the overall score of the MST configuration to increase the likelihood of selecting the MST configuration for a payment transaction.

In another exemplary embodiment, additional services may be provided based on the MST configuration. For example, upon a successful payment transaction, advertisements and/or promotions from other stores or merchants within a predetermined distance of the successful payment transaction may be transmitted to the electronic device 102.

In addition, future MST configurations may be generated based on the execution of the additional services. For example, if a coupon for a first merchant is transmitted to an electronic device 102 after a successful payment transaction is executed at a second store and the electronic device 102 uses the coupon at the first merchant, the electronic device 102 can transmit context data to the MST configuration server 106 associated with the first merchant where the MST configuration server 106 can generate an MST configuration to be used when a payment transaction is initiated at the second merchant.

It is noted that operations 508, 510 and/or 512 are optional and are accordingly illustrated with dashed lines. One of ordinary skill in the art would recognize that none of operations 508, 510, and/or 512 are essential or required for the method of performing the payment transaction illustrated in FIG. 5.

Figure 6:
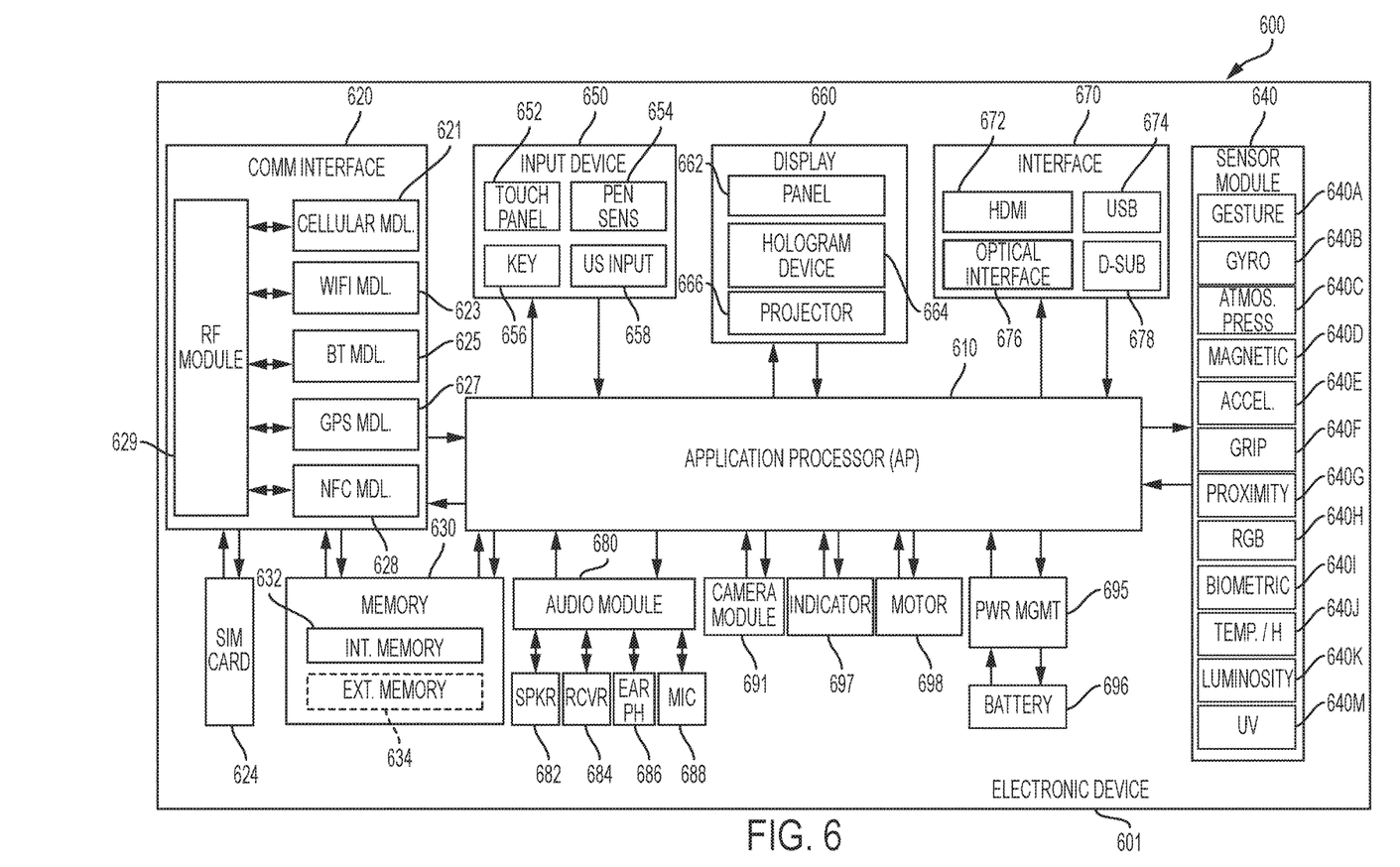
FIG. 6 illustrates a block diagram of hardware associated with an electronic device according to various embodiments of the present disclosure.

FIG. 6 illustrates a block diagram of hardware according to an embodiment of the present disclosure.

Referring to FIG. 6, an electronic device 600 may be, for example, a part or all of the electronic device 102. The electronic device 600 may include one or more Application Processors (AP) 610, a communication interface module 620, a Subscriber Identification Module (SIM) card 624, a memory 630, a sensor module 640, an input module 650, a display module 660, an interface 670, an audio module 680, a camera module 691, a power management module 695, a battery 696, an indicator 697, a motor 698, and/or the like.

The AP 610 may control one or more hardware or software components that are connected to AP 610, perform processing or computation of data (including multimedia data), and/or the like. As an example, the AP 610 may be implemented as a System-on-Chip (SoC). The AP 610 may include a Graphics Processing Unit (GPU) (not shown).

The communication interface module 620 (e.g., the communication interface 208) may transmit and receive data in communications between the electronic device 601 and other electronic devices (e.g., the POS device 104, the MST configuration server 106, the payment transaction server 108, and/or the like). The communication interface module 620 may include one or more of a cellular module 621, a Wi-Fi module 623, a Bluetooth module 625, a GPS module 627, a NFC module 628, a Radio Frequency (RF) module 629, and/or the like.

The cellular module 621 may provide services such as, for example, a voice call, a video call, a Short Messaging Service (SMS), internet service, and/or the like, via a communication network (e.g., LTE, LTE-A, CDMA, WCDMA, UMTS, WiBro, GSM, and/or the like). The cellular module 621 may differentiate and authorize electronic devices within a communication network using a Subscriber Identification Module (SIM) card (e.g., the SIM card 624). According to various embodiments of the present disclosure, the cellular module 621 may perform at least a part of the functionalities of the AP 610. For example, the cellular module 621 may perform at least a part of multimedia control functionality.

According to various embodiments of the present disclosure, the communication interface module 620 and/or the cellular module 621 may include a Communication Processor (CP). As an example, the cellular module 621 may be implemented as SoC.

Although FIG. 6 illustrates components such as the cellular module 621 (e.g., CP), the memory 630, the power management module 695 as components that are separate from the AP 610, according to various embodiments of the present disclosure, the AP 610 may include, or be integrated with, one or more of the foregoing components (e.g., the cellular module 621).

According to various embodiments of the present disclosure, the AP 610, the cellular module 621 (e.g., CP), and/or the like, may process instructions or data received from at least one of non-volatile memory or other components by loading in volatile memory. The AP 610, the cellular module 621, the communication interface module 620, and/or the like, may store at non-volatile memory at least one of data that is received from at least one of the other components or data that is generated by at least one of the other components.

The Wi-Fi module 623, the Bluetooth module 625, the GPS module 627, the NFC module 628, and/or the like may each include one or more processors that may process data received or transmitted by the respective modules. Although FIG. 6 illustrates the cellular module 621, the Wi-Fi module 623, the Bluetooth module 625, the GPS module 627, and the NFC module 628 as separate blocks, according to various embodiments of the present disclosure, any combination (e.g., two or more) of the cellular module 621, the Wi-Fi module 623, the Bluetooth module 625, the GPS module 627, the NFC module 628, and/or the like may be included in an Integrated Chip (IC) or an IC package. For example, at least some of the processors corresponding to the respective cellular module 621, the Wi-Fi module 623, the Bluetooth module 625, the GPS module 627, the NFC module 628, and/or the like, may be implemented as a single SoC. For example, a CP corresponding to the cellular module 621 and a Wi-Fi processor corresponding to Wi-Fi module 623 may be implemented as a single SoC.

The RF module 629 may, for example, transmit and receive RF signals. Although not shown, the RF module 629 may include a transceiver, a Power Amp Module (PAM), a frequency filter, a Low Noise Amplifier (LNA), and/or the like. The RF module 629 may include one or more components for transmitting and receiving Electro-Magnetic (EM) waves (e.g., in free space or the like) such as, for example, conductors or conductive wires. Although FIG. 6 illustrates that the cellular module 621, the Wi-Fi module 623, the Bluetooth module 625, the GPS module 627, and the NFC module 628 are sharing one RF module 629, according to various embodiments of the present disclosure, at least one of the cellular module 621, the Wi-Fi module 623, the Bluetooth module 625, the GPS module 627, the NFC module 628, and/or the like may transmit and receive RF signals via a separate RF module.

The SIM card 624 may be a card implementing a SIM, and may be configured to be inserted into a slot disposed at a specified location of the electronic device. The SIM card 624 may include a unique identifier (e.g., Integrated Circuit Card IDentifier (ICCID)) subscriber information (e.g., International Mobile Subscriber Identity (IMSI)), and/or the like.

The memory 630 (e.g., memory 212) may include an internal memory 632, an external memory 634, or a combination thereof.

According to various embodiments of the present disclosure, the internal memory 632 may be, for example, at least one of volatile memory (e.g., Dynamic Random Access Memory (DRAM), Static Random Access Memory (SRAM) or Synchronous Dynamic Random Access Memory (SDRAM)), non-volatile memory (e.g., One Time Programmable Read Only Memory (OTPROM), Programmable Read Only Memory (PROM), Erasable and Programmable Read Only Memory (EPROM), Electrically Erasable and Programmable Read Only Memory (EEPROM), mask Read Only Memory (ROM), flash ROM, NAND flash memory, NOR flash memory), and/or the like.

According to various embodiments of the present disclosure, the internal memory 632 may be a Solid State Drive (SSD). As an example, the external memory 634 may be a flash drive (e.g., Compact Flash (CF drive), Secure Digital (SD), micro Secure Digital (micro-SD), mini Secure Digital (mini-SD), extreme Digital (xD), Memory Stick, and/or the like). The external memory 634 may be operatively coupled to electronic device 600 via various interfaces. According to various embodiments of the present disclosure, the electronic device 600 may include recording devices (or recording media) such as, for example, Hard Disk Drives (HDD), and/or the like.

The sensor module 640 may measure physical/environmental properties detect operational states associated with electronic device 600, and/or the like, and convert the measured and/or detected information into signals such as, for example, electric signals or electromagnetic signals. As an example, the sensor module 640 may include at least one of a gesture sensor 640A, a gyro sensor 640B, an atmospheric pressure sensor 640C, a magnetic sensor 640D, an accelerometer 640E, a grip sensor 640F, a proximity sensor 640G, an RGB sensor 640H, a biometric sensor 640I, a temperature/humidity sensor 640J, a luminosity sensor 640K, an Ultra Violet (UV) sensor 640M, and/or the like. The sensor module 640 may detect the operation state of the electronic device and/or measure physical properties, and convert the detected or measured information into electrical signals. Additionally, or alternatively, the sensor module 640 may also include, for example, an electrical-nose sensor (not shown), an electromyography (EMG) sensor (not shown), an electroencephalogram (EEG) sensor (not shown), an infrared (IR) sensor (not shown), an eye-scanning sensor (e.g., iris sensor) (not shown), a fingerprint sensor, and/or the like. The sensor module 640 may also include control circuitry for controlling one or more sensors included therein.

The input module 650 may include a touch panel 652, a (digital) pen sensor 654, a key 656, an ultrasonic input device 658, and/or the like.

As an example, the touch panel 652 may detect touch input using capacitive, resistive, infrared, ultrasonic methods, and/or the like. The touch panel 652 may also include a touch panel controller (not shown). As an example, a capacitive-type touch panel may detect proximity inputs (e.g. hovering input) in addition to, or as an alternative to, physical touch inputs. The touch panel 652 may also include a tactile layer. According to various embodiments of the present disclosure, the touch panel 652 may provide haptic (or other) feedback to the user using the tactile layer.

As an example, the (digital) pen sensor 654 may be implemented using methods identical to or similar to receiving a touch input from a user, or using a separate detection sheet (e.g., a digitizer).

As an example, the key 656 may be a keypad, a touch key, and/or the like.

As an example, the ultrasonic input device 658 may be a device configured to identify data by detecting, using a microphone (e.g., microphone 688), ultrasonic signals generated by a device capable of generating the ultrasonic signal. The ultrasonic input device 658 may detect data wirelessly.

According to various embodiments of the present disclosure, the electronic device 600 may receive user input from an external device (e.g., a network, computer or server) connected to the electronic device 600 using the communication interface module 620.

The display module 660 (e.g., the display 204) may include a panel 662, a hologram device 664, a projector 666, and/or the like. As an example, the panel 662 may be, for example, a Liquid-Crystal Display (LCD), an Active-Matrix Organic Light-Emitting Diode (AM-OLED) display, and/or the like. As an example, the panel 662 may be configured to be flexible, transparent, and/or wearable. The panel 662 and the touch panel 652 may be implemented as a single module. The hologram device 664 may provide a three-dimensional image. For example, the hologram device 664 may utilize the interference of light waves to provide a three-dimensional image in empty space. The projector 666 may provide image by projecting light on a surface (e.g., a wall, a screen, and/or the like). As an example, the surface may be positioned internal or external to electronic device 600. According to various embodiments of the present disclosure, the display module 660 may also include a control circuitry for controlling the panel 662, the hologram device 664, the projector 666, and/or the like.

The interface 670 may include, for example, one or more interfaces for a High-Definition Multimedia Interface (HDMI) 672, a Universal Serial Bus (USB) 674, an optical interface 676, or a D-subminiature (D-sub) 678, and/or the like. The interface 670 may be part of the communication interface module 620. Additionally, or alternatively, the interface 670 may include one or more interfaces for Mobile High-definition Link (MHL), Secure Digital (SD)/MultiMedia Card (MMC), Infrared Data Association (IrDA), and/or the like.

The audio module 680 may encode/decode sound into electrical signal, and vice versa. According to various embodiments of the present disclosure, at least a portion of the audio module 680 may be part of the I/O interface 206. As an example, the audio module 680 may encode/decode voice information that is input into, or output from, a speaker 682, a receiver 684, an earphone 686, the microphone 688, and/or the like.

The camera module 691 may capture still images and/or video. According to various embodiments of the present disclosure, the camera module 691 may include one or more image sensors (e.g., front sensor module, rear sensor module, and/or the like) (not shown), an Image Signal Processor (ISP) (not shown), or a flash (e.g., Light-Emitting Diode (flash LED), xenon lamp, and/or the like) (not shown).

The power management module 695 may manage electrical power of the electronic device 600. Although not shown, the power management module 695 may include, for example, a Power Management Integrated Circuit (PMIC), a charger Integrated Circuit (charger IC), a battery gauge, a fuel gauge, and/or the like.

As an example, the PMIC may be disposed in an integrated circuit or an SoC semiconductor. The charging method for the electronic device 600 may include wired or wireless charging. The charger IC may charge a battery, may prevent excessive voltage or excessive current from a charger from entering the electronic device 600, and/or the like. According to various embodiments of the present disclosure, the charger IC may include at least one of a wired charger IC or a wireless charger IC. As an example, the wireless charger IC may be a magnetic resonance type, a magnetic induction type, an electromagnetic wave type, and/or the like. As an example, the wireless charger IC may include circuits such as a coil loop, a resonance circuit, a rectifier, and/or the like.

The battery gauge may measure a charge level, a voltage while charging, a temperature of the battery 696, and/or the like.

The battery 696 may supply power to the electronic device 600. The battery 696 may be a rechargeable battery, a solar battery, and/or the like.

The indicator 697 may indicate one or more states (e.g., boot status, message status, charge status, and/or the like) of the electronic device 600 or a portion thereof (e.g., the AP 610). The motor 698 may convert an electrical signal into a mechanical vibration.

Although not shown, the electronic device 600 may include one or more devices for supporting mobile television (mobile TV) (e.g., a Graphics Processing Unit (GPU)), and/or the like. The devices for supporting mobile TV may support processing of media data compliant with, for example, Digital Multimedia Broadcasting (DMB), Digital Video Broadcasting (DVB), media flow, and/or the like.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents. Various embodiments of the present disclosure are described as examples only and are noted intended to limit the scope of the present disclosure. Accordingly, the scope of the present disclosure should be understood as to include any and all modifications that may be made without departing from the technical spirit of the present disclosure. Those skilled in the art will appreciate that the features described above can be combined in various ways to form multiple variations of the invention.

What is claimed is:

1. A method of performing a payment transaction with a point of sale (POS) device, the method comprising:
   transmitting, by an electronic device, first context data to a magnetic secure transmission (MST) configuration server, the first context data being associated with the payment transaction;
   receiving, by the electronic device, a first MST configuration from the MST configuration server in response to the transmitting of the first context data; and
   executing, by the electronic device, the payment transaction based on the MST configuration,
   wherein the first context data includes one or more of information associated with a merchant corresponding to the POS device or POS device configuration information.

2. The method of claim 1, wherein the first context data includes one or more of electronic device information, payment method information, payment network information, networking data information, electronic device location information, or a combination thereof.

3. The method of claim 1, further comprising:
   receiving an indication that the payment transaction was successful; and
   transmitting a message based on the indication that the payment transaction was successful to the MST configuration server.

4. The method of claim 3, further comprising:
   transmitting second context data to the MST configuration server, the second context data being associated with a second payment transaction with the POS device;
   receiving a second MST configuration from the MST configuration server; and
   executing the second payment transaction based on the second MST configuration,
   wherein the second MST configuration is based on the first MST configuration and the indication that the payment transaction was successful.

5. The method of claim 1,
   wherein the performing of the payment transaction is initiated by the electronic device, and
   wherein the first context data is transmitted after the payment transaction is initiated.

6. The method of claim 1, wherein the executing of the payment transaction comprises:
   generating a signal based on the first MST configuration, the signal including payment information; and
   transmitting the signal to the POS device.

7. An electronic device, comprising:
   a display;
   a transceiver configured to transmit and receive signals;
   a memory, wherein one or more programs are stored in the memory; and
   one or more processors configured to execute instructions of the one or more programs, the one or more programs including instructions for:
      transmitting first context data to a magnetic secure transmission (MST) configuration server, the first context data being associated with a payment transaction with a point of sale (POS) device,
      receiving a first MST configuration from the MST configuration server in response to the transmitting of the first context data, and
      executing the payment transaction based on the MST configuration,
   wherein the first context data includes one or more of information associated with a merchant corresponding to the POS device or POS device configuration information.

8. The electronic device of claim 7, wherein the first context data further includes one or more of electronic device information, payment method information, payment network information, networking data information, electronic device location information, or a combination thereof.

9. The electronic device of claim 7, wherein the one or more processors are further configured to execute instructions of the one or more programs, the one or more programs further include instructions for:
   receiving an indication that the payment transaction was successful, and
   transmitting a message based on the indication that the payment transaction was successful to the MST configuration server.

10. The electronic device of claim 9, wherein the one or more processors are further configured to execute instructions of the one or more programs, the one or more programs further include instructions for:
   transmitting second context data to the MST configuration server, the second context data being associated with a second payment transaction with the POS device,
   receiving a second MST configuration from the MST configuration server, and
   executing the second payment transaction based on the second MST configuration,
   wherein the second MST configuration is based on the first MST configuration and the indication that the payment transaction was successful.

11. The electronic device of claim 7, wherein the one or more processors are further configured to execute instructions of the one or more programs, the one or more programs further include instructions for:
   receiving an input at the electronic device indicative of initiating the payment transaction,
   wherein the first context data is transmitted to the MST configuration server after the payment transaction is initiated, and
   wherein the payment transaction is initiated by a payment transaction application stored at the electronic device.

12. The electronic device of claim 7, wherein the one or more processors are further configured to execute instructions of the one or more programs, the one or more programs further include instructions for:
   generating a signal based on the first MST configuration, the signal including payment information, and
   transmitting the signal to the POS device.

13. The electronic device of claim 7, further comprising:
   a global positioning system (GPS) sensor,
   wherein the one or more processors are further configured to execute instructions of the one or more programs, the one or more programs further include instructions for:
      determining a location coordinate of the electronic device based on a signal received from the GPS sensor, and
   wherein the first context data includes the location coordinate of the electronic device.

14. A method of providing a magnetic secure transmission (MST) configuration for a purchase transaction between an electronic device and a point of sale (POS) device, the method comprising:

receiving, at a MST configuration server, context data associated with the purchase transaction from the electronic device;

determining, at the MST configuration server, an MST configuration based on the context data; and transmitting, from the MST configuration server, the MST configuration to the electronic device, wherein the MST configuration is used to execute the purchase transaction, and wherein the context data includes one or more of information associated with a merchant corresponding to the POS device or POS device configuration information.

15. The method of claim 14, wherein the context data further includes one or more of electronic device information, payment method information, payment network information, networking data information, electronic device location information, or a combination thereof.

16. The method of claim 14, further comprising:

receiving an indicator that the payment transaction was successful.

17. The method of claim 16, further comprising:

updating information associated with the MST configuration based on the indicator that the payment transaction was successful.

18. The method of claim 14, wherein a plurality of MST configurations is determined based on the context data, and wherein the plurality of MST configurations is transmitted to the electronic device.

19. The method of claim 14, wherein the MST configuration includes one or more MST configuration elements based on the context data.

20. The method of claim 14, wherein the determining of the MST configuration comprises:

generating the MST configuration based on the received context data, or retrieve a previously generated MST configuration based on the received context data.

* * * * *